United States Patent [19]

Hamaue

[11] Patent Number: 5,222,387
[45] Date of Patent: Jun. 29, 1993

[54] ACCELERATION SENSOR WITH VARIABLE ACCELERATION DETECTION SENSITIVITY

[75] Inventor: Tetsuya Hamaue, Shiga, Japan

[73] Assignee: Takata Corporation, Tokyo, Japan

[21] Appl. No.: 688,167

[22] Filed: Apr. 19, 1991

[30] Foreign Application Priority Data

Apr. 23, 1990 [JP] Japan .................. 2-108140

[51] Int. Cl.[5] .......................... G01P 15/135
[52] U.S. Cl. ......................... 73/1 D; 73/514; 200/61.48
[58] Field of Search ............ 73/1 D, 514, 493, 517 R; 200/61.48; 242/107.4 A; 280/735, 806

[56] References Cited

U.S. PATENT DOCUMENTS

| 3,674,950 | 7/1972 | Scoville | 200/61.48 |
| 3,938,754 | 2/1976 | Stephenson et al. | 242/107.4 A |
| 3,938,755 | 2/1976 | Stephenson et al. | 242/107.4 A |
| 3,955,398 | 5/1976 | Watson et al. | 73/1 D |
| 4,321,438 | 3/1982 | Emenegger | 200/61.48 |
| 4,610,480 | 9/1986 | Yamada et al. | 242/107.4 A |

*Primary Examiner*—John E. Chapman
*Attorney, Agent, or Firm*—Brumbaugh, Graves, Donohue & Raymond

[57] ABSTRACT

A sensor for outputting a signal in response to swinging of a pendulum when acceleration acts upon the sensor is provided with a tilting mechanism for tilting the frame of the sensor with respect to a support therefor, and a control for actuating the tilting mechanism so as to change position that the pendulum occupies, relative to an output signal switch, in the absence of applied acceleration. As a result, the swinging distance of the pendulum from its initial position to the position at which the output signal is produced is changed, thereby changing the corresponding value of acceleration which prevails at the time of signal output.

1 Claim, 5 Drawing Sheets

FIG. 3A
FIG. 3B
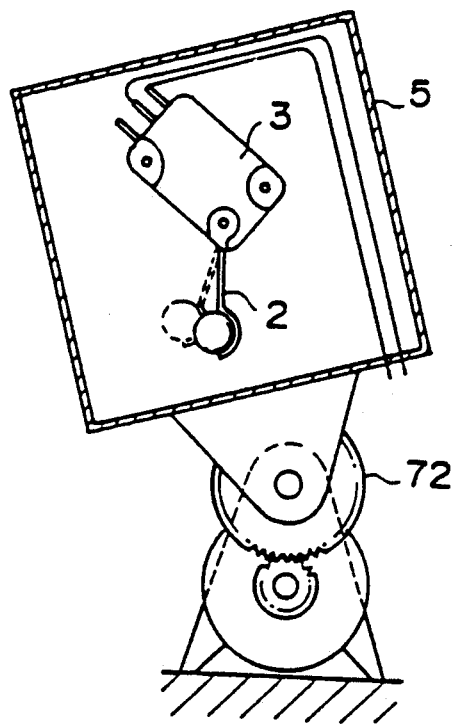
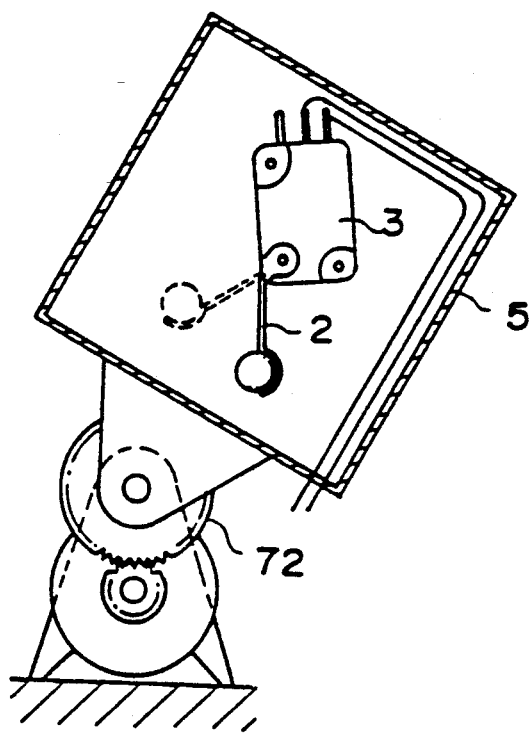

ACCELERATION SENSOR WITH VARIABLE ACCELERATION DETECTION SENSITIVITY

BACKGROUND OF THE INVENTION

This invention relates to a sensor for sensing acceleration. More particularly, the invention relates to an acceleration sensor suitable for use in sensing deceleration in conjunction with actuation of a tensionless release mechanism of a belt retractor in a vehicle seat belt system, i.e., a mechanism that releases a tension relief mechanism of the retractor and restores winding force to the belt reel.

When a vehicle such as an automotive vehicle accelerates, decelerates or turns, acceleration (hereinafter sometimes referred to as "G") conforming to such motion acts upon the vehicle. In order to sense G and take suitable measures to protect the body of a passenger in the vehicle, a G sensor is used as means for actuating a passenger protective apparatus.

By way of example, a sensor of this type in an automotive vehicle is used for actuating a tensionless release mechanism of a retractor that winds up the seat belt in a seat belt system.

FIG. 8 is a side view schematically illustrating the construction of a previously proposed G sensor. The sensor includes a pendulum 02 having a body or mass 01, a switch 03, a signal line 04 and a sensor frame 05. The pendulum 02 is supported on the sensor frame 05 by a shaft 06 to swing freely in the direction of arrow A in FIG. 8 when acceleration acts upon the sensor, or, more precisely, the pendulum. Owing to swinging of the pendulum 02, the switch 03 is opened and produces an output signal on the signal line 04. The sensor is further provided with a spring 07 which biases the pendulum 02 in the direction of arrow B in FIG. 8 for the purpose of closing the switch 03, and a buffer 08 which absorbs the impact of the body 01 against the sensor frame 05.

Since a sensor of this kind is adapted to output a signal in response to a predetermined G, an output in response to a value of G which differs depending upon the prevailing conditions cannot be obtained.

With a tensionless release mechanism of a retractor, there is a need for operation which conforms to the psychological state of the passenger. In particular, there are cases where it is desired that a G that results in actuation of the release mechanism be made to have different values at high velocity and low velocity travel of the vehicle.

When it is attempted to realize such an operating system using the already proposed sensor described above, a complicated system is required in which a multiplicity of sensors are used and a signal circuit is provided for selecting an output from one of the sensors in dependence upon travelling velocity. Such a system involves problems in terms of reliability and cost.

SUMMARY OF THE INVENTION

The present invention has been devised in view of the foregoing circumstances, and its object is to provide a G sensor in which the value of G capable of being sensed can be changed, in accordance with desired or necessary conditions.

According to the present invention, the foregoing object is attained by providing a sensor for outputting a signal in response to swinging of a pendulum when acceleration acts upon the sensor. The invention is characterized in that a tilting mechanism is provided for tilting a frame of the sensor with respect to a support portion thereof, and a control apparatus is provided for actuating the tilting mechanism so as to change the position of the pendulum, generally along a path of swinging motion, in the absence of applied acceleration.

With the G sensor of the present invention, in which the value of G sensed can be varied, the tilting mechanism is actuated by the control means so that the position of the pendulum in the absence of applied acceleration is changed along the path of swinging motion. As a result, the swinging distance of the pendulum from its initial position to the position at which the output signal is produced is changed, thereby changing the corresponding value of G which prevails at the time of signal output.

DESCRIPTION OF THE DRAWINGS

FIGS. 3A and 3B are views illustrating the operation of the sensor of FIG. 1;

DESCRIPTION OF THE PREFERRED EMBODIMENT

Embodiments of the present invention will now be described in detail with reference to the accompanying drawings.

Figure 1:
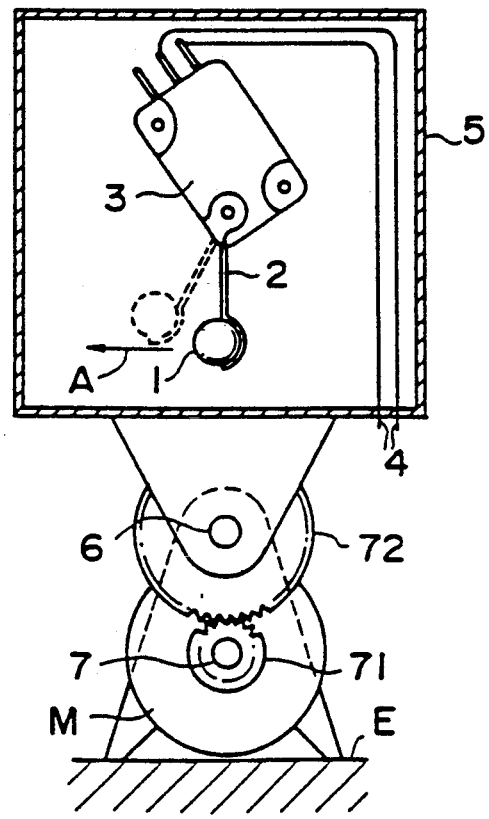
FIG. 1 is a schematic view illustrating the construction of a G sensor according to a first embodiment of the present invention.

In the embodiment illustrated in FIG. 1, the sensor according to the invention includes a pendulum 2 having a mass or body 1, a microswitch 3, a signal line 4 and a sensor frame 5. The arrangement is such that the microswitch 3 is opened (or closed) by swinging (indicated by the dashed lines) of the pendulum when an acceleration A acts upon the sensor, as a result of which a signal is outputted on the signal line 4. The position of the pendulum 2 when acceleration is not acting upon the sensor is capable of being altered along the path of swinging motion More specifically, the sensor frame 5 is tiltable, with respect to a support portion E, about a support shaft 6. The sensor further includes a tilting mechanism 7 for tilting the sensor frame 5 relative to the support portion E. In this embodiment, the tilting mechanism 7 comprises a motor M supported on the support portion E, a gear 71 secured to a rotary shaft of the motor M, and a gear 72 secured to the sensor frame 5 and meshed with the gear 71.

Figure 2:
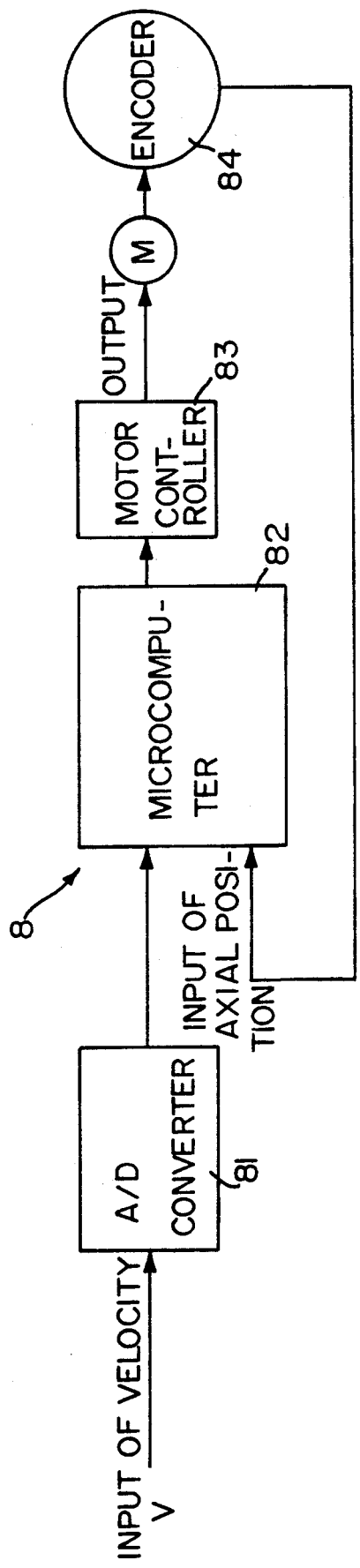
FIG. 2 is a block diagram of a motor control circuit suitable for a control means of the sensor.

In FIG. 2, a control means 8 for the motor M includes an A/D converter 81 for converting into a digital signal an analog signal input indicative of vehicle velocity V outputted by a speedometer of a vehicle, a microcomputer 82 which processes the converted signal received from the A/D converter 81 and outputs a control signal, a motor controller 83 for controlling the motor M based upon the control signal, and an encoder 84 for converting rotation of the motor M into a digital position signal and feeding the position signal back to the microcomputer 82.

In the sensor of the first embodiment thus constructed, the microcomputer 82 of the control means 8 applies a control signal conforming to vehicle velocity V to the motor controller 83, whereby the gear 71 is rotated accordingly. Since this rotates the gear 72 meshing with the gear 71, the sensor frame 5 is tilted by an amount commensurate with the angle through which the gear 72 turns, as shown in FIG. 3. Since the force of gravity always tends to keep the pendulum 2 in its vertical attitude, regardless of this tilting of the sensor frame, the result is that the non-actuating position of the pendulum and the position of the pendulum at which it actuates the microswitch 3 are brought closer together, as shown in FIG. 3A (or spaced farther apart, as illustrated in FIG. 3B), thus altering the value of G that actuates the microswitch 3. In other words, the closer together the two positions are, the smaller the value of G in response to which a signal is outputted.

Figure 4:
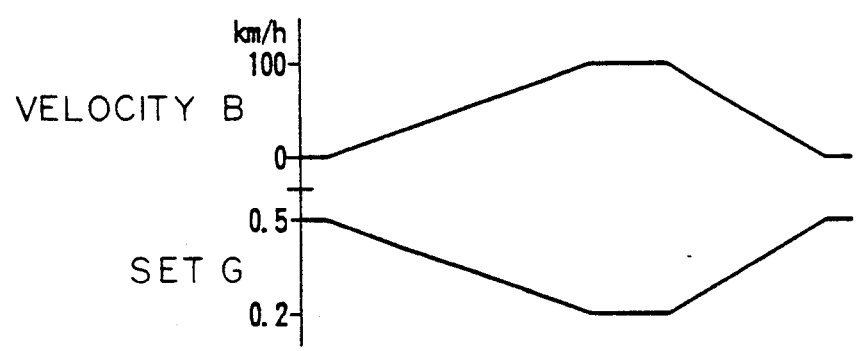
FIG. 4 is a graph of the relationship between vehicle velocity and a set G at various times in a case where the value of G sensed is altered and set depending upon vehicle velocity.

FIG. 4 is a graph illustrating, by an actual example, the relationship between vehicle velocity and a set G at various times in a case where the G sensed is altered and set based upon vehicle velocity. In this example, G is changed continuously over a range of from 0.5 to 0.2 with respect to values of velocity V ranging from 0 to 100 km/h. In a case where such control is applied to the tensionless release mechanism of a retractor of a seat belt system, the body of a passenger can be restrained by the seat belt at a lower G as vehicle velocity is increased, thereby making it possible to realize a belt-fastening sensation conforming to the psychological state of the passenger.

Figure 5:
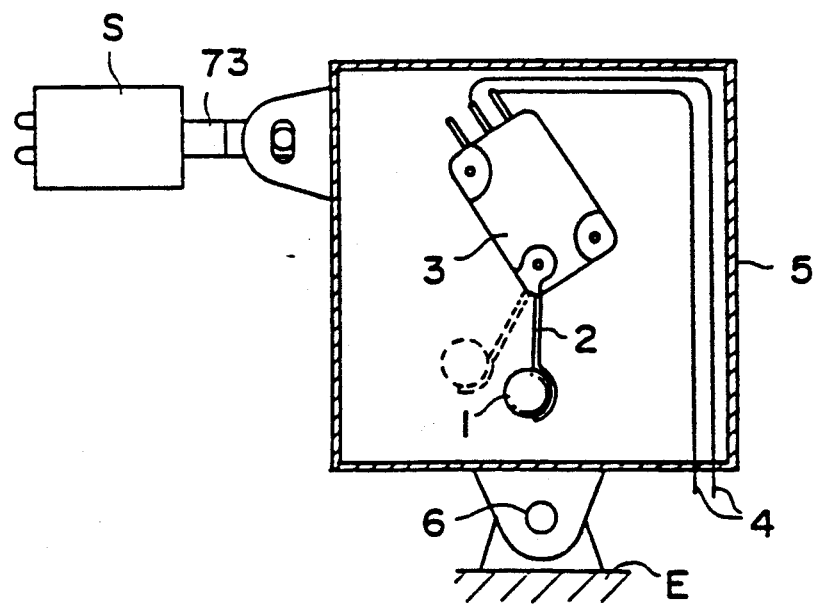
FIG. 5 is a schematic view illustrating a second embodiment of the present invention.

In FIG. 5 a second embodiment of the present invention attains adjustment of the sensor using a solenoid S instead of a servomotor. More specifically, the solenoid S has a plunger 73 connected to the sensor frame 5.

Figure 6:
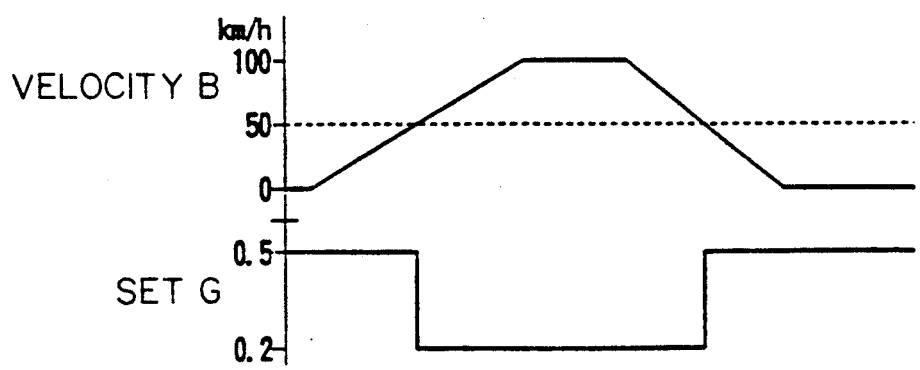
FIG. 6 is a graph illustrating another case where the value of G sensed is altered and set depending upon vehicle velocity.

In this arrangement also, the G at which a detection signal is produced is capable of being changed, as in the first embodiment described above. In this case, as illustrated by the graph of FIG. 6 showing the relationship between vehicle velocity V and set G at various times, control is executed so as to change over G to 0.5 or 0.2, with a velocity of 50 km/h indicated by the dashed line serving as a boundary, with regard to values of vehicle velocity V ranging from 0 to 100 km/h. Naturally, in this case also, control for continuous variation as shown in FIG. 4 is possible if the solenoid S is subjected to duty control. Conversely, in the foregoing example, it goes without saying that changeover control of the kind shown in FIG. 6 is possible if the servomotor M is subjected to step-wise control.

Figure 7:
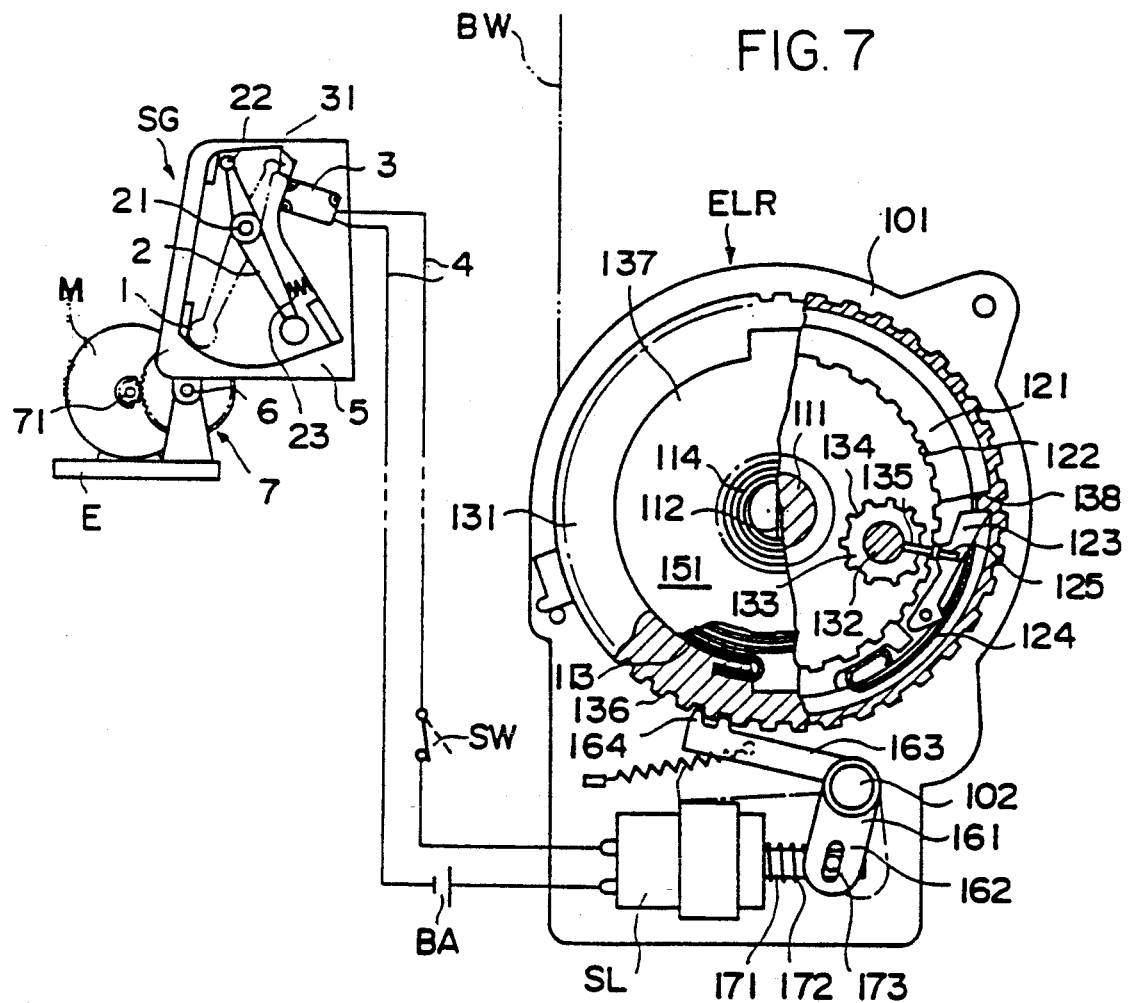
FIG. 7 shows an example of an application of the present invention to a seat belt system.
Figure 8:
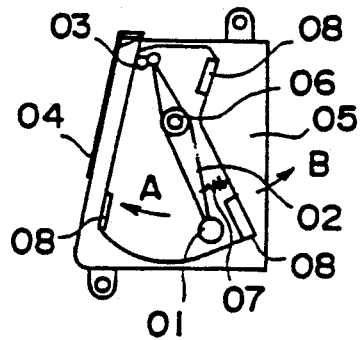
FIG. 8 is a schematic view showing the construction of a G sensor according to the prior art.

Finally, it will be instructive to illustrate an example of an application in which the present invention is applied to a seat belt system. FIG. 7 is a diagram showing the construction of such an application, in which a sensor SG capable of varying the G that is sensed has the pendulum 2 mounted to pivot and operate a microswitch 3. An arm of the pendulum 2 opposite the arm on which the body 1 is provided has a contact portion 22 for actuating a lever 31 of the microswitch 3. The pendulum 2, which is supported on a support shaft 21, is capable of being tilted about the support shaft. A tension spring 23 is connected at one end to the sensor frame 5 and at its other end to the pendulum 2 near the body 1. The spring 23 impedes movements of the pendulum 2 in the absence of an applied G. Other components, such as the control means 8, are similar to those of the first embodiment. These components are designated by like reference characters and need not be described again.

The signal line 4 of the sensor SG has one end connected to a solenoid SL via a switch SW arranged in a buckle of the seat belt system and closed by reception of a through-tongue on the belt in the buckle, and its other end connected to the solenoid SL via a power supply, such as the battery BA of the vehicle.

The solenoid SL is mounted on a retainer 101 attached to the frame of a retractor ELR which winds up a belt BW of the seat belt system. The solenoid SL has a plunger 171 connected to a tensionless release mechanism of the retractor ELR.

The retractor ELR includes an emergency locking mechanism (not shown) arranged on one side of the frame and part of a tensionless mechanism provided on the side of the frame opposite the locking mechanism. The tensionless mechanism is placed in the set state by pulling the belt BW after the seat belt is fastened, and this position of the belt is memorized so that even if the belt is subsequently pulled out by ordinary movement of the passenger's body, the belt will be rewound up to the set position to maintain the tensionless set state. The components of this mechanism are a friction plate (not shown) on the outer side of the retainer 101, and a gear plate 121, a toothed wheel 131, a memory spring 113, a spring cap 137, a return spring 114, and a cover (not shown), which are disposed successively on the outer side of the friction plate in the order mentioned.

The gear plate 121 has a flange portion extending diametrically from a hub portion secured to a reel shaft 111, and a ring portion extending axially from the outer circumference of the flange portion. Inner teeth 122 are formed on the ring portion. The toothed wheel 131, which has the same shape as the gear plate 121 and includes outer teeth 136 formed on its perimeter, is freely rotatably supported on the hub portion of the gear plate 121 by fitting the hub portion into a center hole of the toothed wheel 131. The outer side face of the gear plate 121 has a recess, one end of a hook 123 is pivotally supported in the recess and a spring 124 is installed in the recess to bias the hook 123 in a direction toward the reel shaft 111. The middle of the hook 123 is provided with a projecting portion 125 which projects toward the center axis of the gear plate 121.

The toothed wheel 131 has a support shaft 132 projecting from the side face of its flange portion. An idle gear 133 is axially supported on the support shaft 132, and outer teeth 134 of the idle gear 133 mesh with the inner teeth 122. The outer side face of the idle gear 133 is provided with a projection 135, which is disposed at a position where it will engage the projection 125. The inner circumference of the toothed wheel 131 is formed to have an inward projection 138 capable of being engaged with the free end of the hook 123.

The memory spring 113, which is a helical spring, is arranged inside the ring portion of the toothed wheel 131. The inner end portion of the spring is bent toward the center thereof and is engaged with a slit 112 in the tip of the reel shaft 111. The outer end of the spring is bent into a U-shaped configuration and is anchored in a groove of the toothed wheel 131. Accordingly, the toothed wheel 131 receives a biasing force from the spring 113 directed clockwise about the reel shaft 111.

The outer side of the portion of the toothed wheel 131 accommodating the memory spring 113 is covered by the spring cap 137, and the return spring 114 (only the inner portion of which is shown), which is helical in shape, is located on the outer side of the cap 137. The inner end of the spring 114 is engaged with the slit in the tip of the reel shaft 111. The outer end of the spring 114 is anchored in a cover, which is not shown. Accordingly, the reel shaft 111 and the gear plate 121 secured thereto are acted upon by a counterclockwise biasing force at all times.

The tensionless release mechanism includes a lever 161 freely rotatably supported on a support shaft 102 projecting from the retainer 101. The lever 161 has one arm 162 formed to have a slot, with which a pin 173 of the plunger 171 is mated, and another arm 163, the distal end of which has a pawl 164 extending in the tangential direction of the toothed wheel 131 and capable of freely engaging with and disengaging from the outer teeth 136. In FIG. 7, numeral 172 denotes a restoration spring for restoring the plunger 171. The tensionless mechanism is shown to be in the set state in FIG. 7.

When the sensor SG senses a G which exceeds a predetermined value for which the sensor has been adjusted and installed, the pendulum 2 swings to the position indicated by the phantom line and turns the lever 31 of the microswitch 3. As a result, the contacts of the microswitch 3 are opened so that the current which flows through the signal line 4 is interrupted. Consequently, the solenoid SL is deenergized so that the lever 161 is turned counterclockwise by the action of the restoration spring 172, thereby disengaging the outer teeth 136 and the pawl 164 so that the toothed wheel 131 can now be rotated. Therefore, owing to the return spring 114, the reel shaft 111, gear plate 121 and toothed wheel 131 are rotated counterclockwise so that release from the tensionless state by winding up the belt BW is carried out. It should be noted that the transmission of rotational motion from the gear plate 121 to the toothed wheel 131 in this series of operations takes place owing to the engagement between the hook 123 and inward projection 138 disposed on these components.

In the sensor described above, the tilting mechanism 7 is tilted by the control means to change the position of the pendulum 2, which prevails in the absence of applied acceleration, along the path of swinging motion. As a result, the swinging distance of the pendulum 2 from its initial position (indicated by the solid lines in FIG. 7) to the position (indicated by the phantom lines) at which an output signal is produced changes, and hence there is a change in the corresponding value of G which prevails when the output signal is produced. Accordingly, when such an arrangement is adapted in a seat belt apparatus, it is possible to perform a tensionless release operation which is better adapted to the sensation of the passenger wearing the seat belt.

Though the present invention has been described in detail based upon the foregoing embodiment, the invention is not limited to these embodiments but can be modified in various ways within the scope of the claims.

In accordance with the present invention, as described in detail above, the value of G which prevails when a sensor produces an output signal can be set and changed during use of the sensor. This makes it possible to provide a sensor capable of being used for various purposes requiring a change in the sensitivity of the sensor during sensing or after sensitivity has been set.

I claim:

1. An acceleration sensor with variable acceleration detection sensitivity comprising a frame, a pendulum pivotally mounted on the frame so as to swing in response to acceleration of the pendulum, a circuit adapted to generate an output signal in response to swinging of the pendulum, a support for the frame, the frame being pivotally mounted on the support to tilt in a direction corresponding generally to the direction of swinging of the pendulum, drive means for changing the amount of tilt of the frame relative to the support between at least two different positions, and control means for actuating the drive means.

* * * * *